(12) United States Patent
Meshchaninov et al.

(10) Patent No.: US 11,935,690 B1
(45) Date of Patent: Mar. 19, 2024

(54) INDUCTOR FOR REACTOR OF WASTE TREATMENT DEVICE

(71) Applicants: Mikhail Aleksandrovich Meshchaninov, Zhukovskiy (RU); Dmitrii Yanovich Agasarov, Krasnodar (RU); Anton Viktorovich Sergeev, Krasnodar (RU)

(72) Inventors: Mikhail Aleksandrovich Meshchaninov, Zhukovskiy (RU); Dmitrii Yanovich Agasarov, Krasnodar (RU)

(73) Assignees: Mikhail Aleksandrovich Meshchaninov, Zhukovskiy (RU); Dmitrii Yanovich Agasarov, Krasnodar (RU); Anton Viktorovich Sergeev, Krasnodar (RU)

( * ) Notice: Subject to any disclaimer, the term of this patent is extended or adjusted under 35 U.S.C. 154(b) by 0 days.

(21) Appl. No.: 18/377,873

(22) Filed: Oct. 9, 2023

Related U.S. Application Data

(63) Continuation of application No. PCT/RU2023/000236, filed on Aug. 3, 2023.

(30) Foreign Application Priority Data

May 4, 2023 (RU) ................................ 2023111617

(51) Int. Cl.
*B01J 19/08* (2006.01)
*H01F 27/29* (2006.01)

(52) U.S. Cl.
CPC ............ *H01F 27/29* (2013.01); *B01J 19/087* (2013.01); *B01J 19/088* (2013.01)

(58) Field of Classification Search
CPC ....... H01F 27/29; B01J 19/087; B01J 19/088; B01J 20/20; B01J 20/3416;
(Continued)

(56) References Cited

U.S. PATENT DOCUMENTS 8,049,170 B2 * 11/2011 Sekoguchi ............ H01T 23/00
361/231
2012/0028561 A1 2/2012 Takado

FOREIGN PATENT DOCUMENTS

RU 2272825 C2 3/2006
RU 2696231 C1 7/2019
(Continued)

OTHER PUBLICATIONS

Search report in RU 2023111617 machine translation.

*Primary Examiner* — Xiuyu Tai
(74) *Attorney, Agent, or Firm* — Bardmesser Law Group

(57) ABSTRACT

Electrode/inductor for devices for disposing waste by plasma-chemical destruction method, the inductor located between the electrode and conductive surfaces of the cavity with gaps towards them. The inductor is formed by two truncated regular pyramids with bottom bases located in one plane and top bases located in another plane. The pyramids are rotated relative to each other around their common axis. In all or some of side facet planes of the pyramids, metal side facet plates are located, that are connected to metal plates of the upper and bottom bases located in planes of the upper and bottom bases with gaps between lateral edges of adjacent side facet plates. An electrode of the inductor is placed along the common axis of the pyramids. The inductor electrode is connected to the metal plates of the upper and bottom bases and protrudes beyond the top base towards the reactor electrode.

11 Claims, 6 Drawing Sheets

(58) Field of Classification Search
CPC .............. B01J 2219/0809; B01J 19/006; B01J 2219/0894; B09B 3/70; B09B 3/50; B09B 2101/25; F23G 5/085; F23G 5/40; C01B 32/366; B03C 3/011; B03C 2201/10; B03C 3/41; B03C 2201/06; B03C 3/68; B03C 3/383; H05H 1/466; H05H 1/46; F24F 11/64; F24F 8/192; F24F 11/79; F24F 11/52; F24F 11/77; F24F 11/30; F24F 8/194; F24F 2006/065; F24F 8/90; F24F 2110/10; F24F 2110/60; F24F 2110/20; F24F 8/30; B01D 53/32; B01D 2259/818; Y02A 50/20; Y02B 30/70; H01T 23/00
See application file for complete search history.

(56) References Cited

FOREIGN PATENT DOCUMENTS

| | | |
|---|---|---|
| RU | 2763742 C2 | 12/2021 |
| RU | 2786209 C1 | 12/2022 |
| SU | 1713467 A1 | 2/1992 |
| UA | 26176 C2 | 6/1999 |

* cited by examiner

INDUCTOR FOR REACTOR OF WASTE TREATMENT DEVICE

BACKGROUND OF THE INVENTION

Field of the Invention

The invention relates to devices for solid and/or liquid waste disposal, in particular, to components of devices for disposing waste by plasma-chemical destruction method.

Field of the Related Art

Patent RU 2786209 (published on Dec. 19, 2022) describes a reactor implemented in form of a closed cavity having an input opening connected to a waste feed device, and an output opening for discharging gaseous products of destruction, wherein inner surfaces of the cavity are made fully or partially conductive. An electrode protrudes into the reactor, and this electrode is isolated from the inner surfaces. The electrode is connected to a source of high-voltage pulses. Size of a gap between the electrode and the conductive bottom of the cavity assures formation of corona discharge plasma streamers.

Drawbacks of the known device are small size of area of active plasma-chemical reactions located near the gap between the electrode and closest conductive surfaces of the cavity, where the streamers are formed, and possibility of filling this area with waste that is fed via the input opening, which hampers destruction of waste within the rest of the reactor volume.

SUMMARY OF THE INVENTION

The invention is directed to enhancement of reactor operations by broadening an area of active plasma-chemical reactions in the reactor due to configuration of an inductor located between the electrode and conductive surfaces of the cavity with gaps towards them, which also reduces a possibility of filling this area with waste that is fed via the input opening.

This technical effect is attained with the inductor implemented in form of two truncated regular pyramids with bottom bases located in one plane and top bases located in another plane. The pyramids are rotated relative to each other around their common axis. Metal side facet plates are located in all or some of side facet planes of the truncated pyramids. These plates are connected to metal plates of the upper and bottom bases located in planes of the upper and bottom bases so as gaps are provided between lateral edges of adjacent side facet plates. An electrode of the inductor is placed along the common axis of the truncated pyramids. The inductor electrode is connected to the metal plates of the upper and bottom bases and protrudes beyond the top base towards the reactor electrode.

When a high voltage pulse is caused in the reactor equipped with the inductor, burst of a gap between the reactor electrode and the inductor electrode occurs. Highly divergent fields are formed near inductor structure portions having highly curved surfaces, thus causing corona discharge streamers that propagate towards the conductive surfaces of the reactor cavity. This effect broadens area of active plasma reactions. Pyramidal shape of the inductor structure facilitates removal of waste from the area of active plasma reactions, the waste being fed via the input opening, which also facilitates enhancement of the reactor operations.

Preferably, the truncated pyramids are rotated around their common axis by an angle so as each side rib of one truncated pyramid is located at equal distances from two adjacent side ribs of the other truncated pyramid.

In one embodiment, lower end of the inductor electrode protrudes beyond the bottom base plate, wherein upper end and/or lower end of the inductor electrode are sharpened.

In one embodiment, radii of inscribed circles of the bottom bases of the truncated pyramids are equal, while radii of inscribed circles of the top bases of the truncated pyramids are different.

Preferably, places of connection of the side facet plates of the truncated pyramids to the bottom base plate are interleaved.

Preferably, the side facet plates are provided in form of trapezoids.

In one embodiment, upper ribs of the side facet plates of the truncated pyramids are located along a circle being coaxial with the inductor electrode.

Preferably, upper ribs of the side facet plates are next but one connected to the top base plate along two circles being coaxial with the inductor electrode.

In one embodiment, the top base plate is provided in form of a rectangular shifted towards the input opening of the reactor away from the axis of the truncated pyramids of the inductor, wherein the top base plate has holes and ribs directed to the bottom base. A side facet plate of one of the truncated pyramids is absent under the top base plate and a metal side plate is secured instead of the absent side facet plate between the bottom base and free end of the top base plate. The metal side plate has reinforcement ribs located on surface thereof facing the inductor electrode.

In one embodiment, the bottom base plate has holes and ribs directed away from the top base.

Additional features and advantages of the claimed solution are described in the following disclosure, as well as proved by the actual practice of the invention. These advantages and improvements can be achieved by neural networks that have been constructed and trained in accordance with the claimed method, specifically, following the disclosure, along with the accompanying claims and drawings.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows a vertical cross-section of a reactor with an inductor.

FIG. 2 shows a front view of the inductor.
FIG. 3 shows a ¾ left side view of the inductor.
FIG. 4 shows a ¾ right side view of the inductor.
FIG. 5 shows a ¾ view of the inductor from below.
FIG. 6 shows a view of the inductor from above.

DETAILED DESCRIPTION OF EMBODIMENTS OF THE INVENTION

Reference will now be made in detail to the preferred embodiments of the present invention, examples of which are illustrated in the accompanying drawings.

FIG. 1 shows a vertical cross-section of a reactor with an inductor, and FIG. 2 shows a front view of inductor. The following designators are used are used in the figures:
1 reactor body with inner cavity
2 input opening
3 output opening
4 inner surface of reactor cavity
5 conductive portions of inner surface of reactor cavity
6 sharpened electrode of reactor
7 isolation members
8 source of high-voltage pulses
9 tip of electrode of reactor
10 conductive bottom of reactor
11 dispensing device for feeding waste to be treated
12 electrostatic filter with extraction air fan
13 inductor
14 isolation members to elevate inductor above conductive bottom (10) of reactor.
15 metal plate of top base
16 metal plate of bottom base
17 metal side facet plates of first truncated pyramid
18 metal side facet plates of second truncated pyramid
19 electrode of inductor
20 gaps between side facet plates
21 ribs of side facet plates
22 side plate
23 ribs of side plate
24 ribs of metal plate of top base
25 ribs of metal plate of bottom base.

Figure 1:
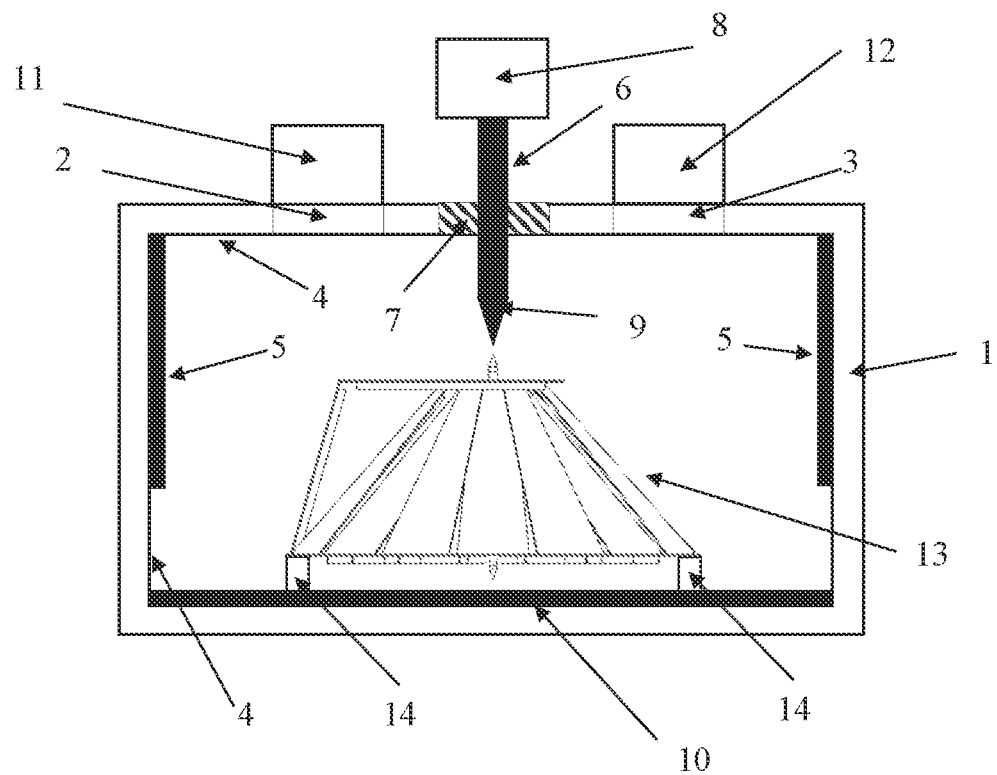
Figure 2:
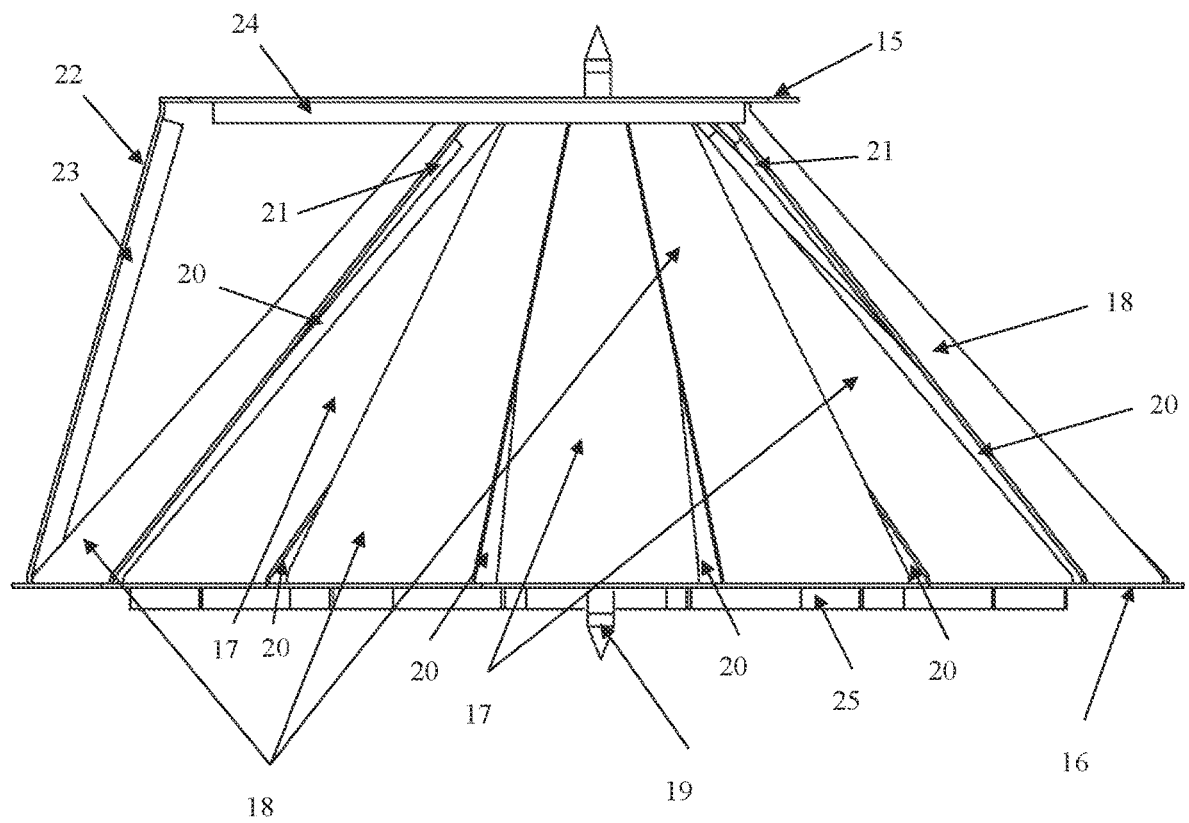
Figure 3:
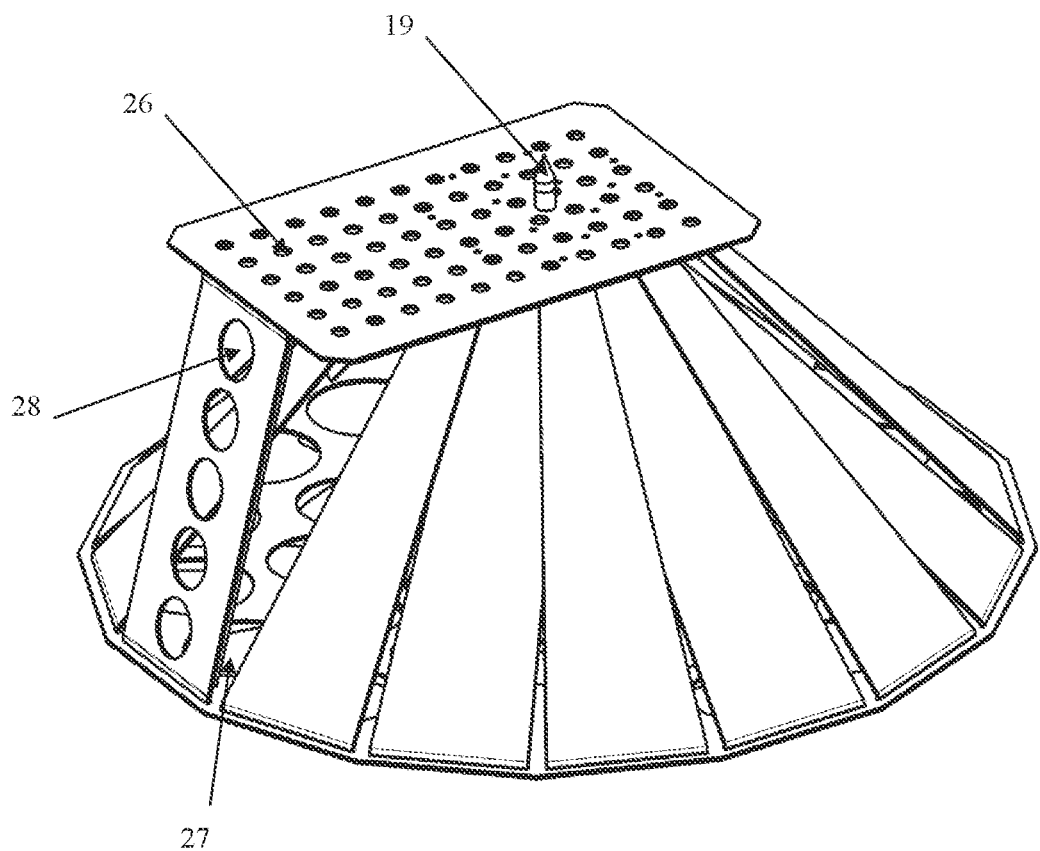
FIG. 3 shows a ¾ left side view of inductor, where the following designators are used:
26 holes in metal plate of top base
27 holes in metal plate of bottom base
28 holes in metal side plate.
Figure 4:
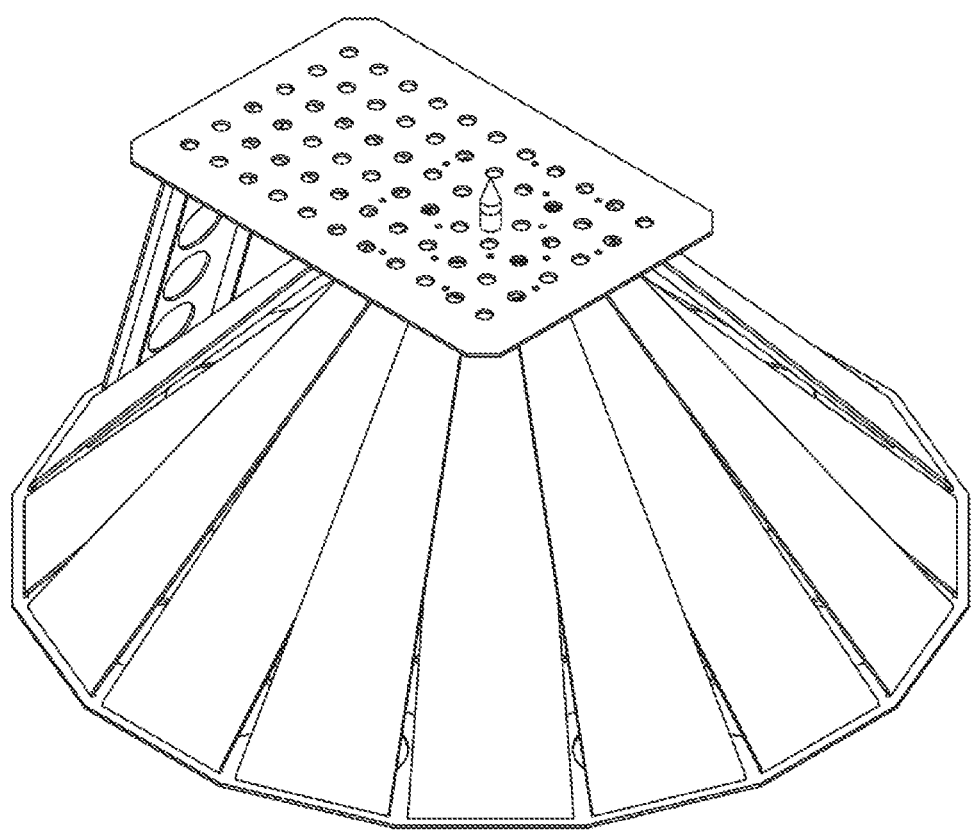
FIG. 4 shows a ¾ right side view of the inductor.
Figure 5:
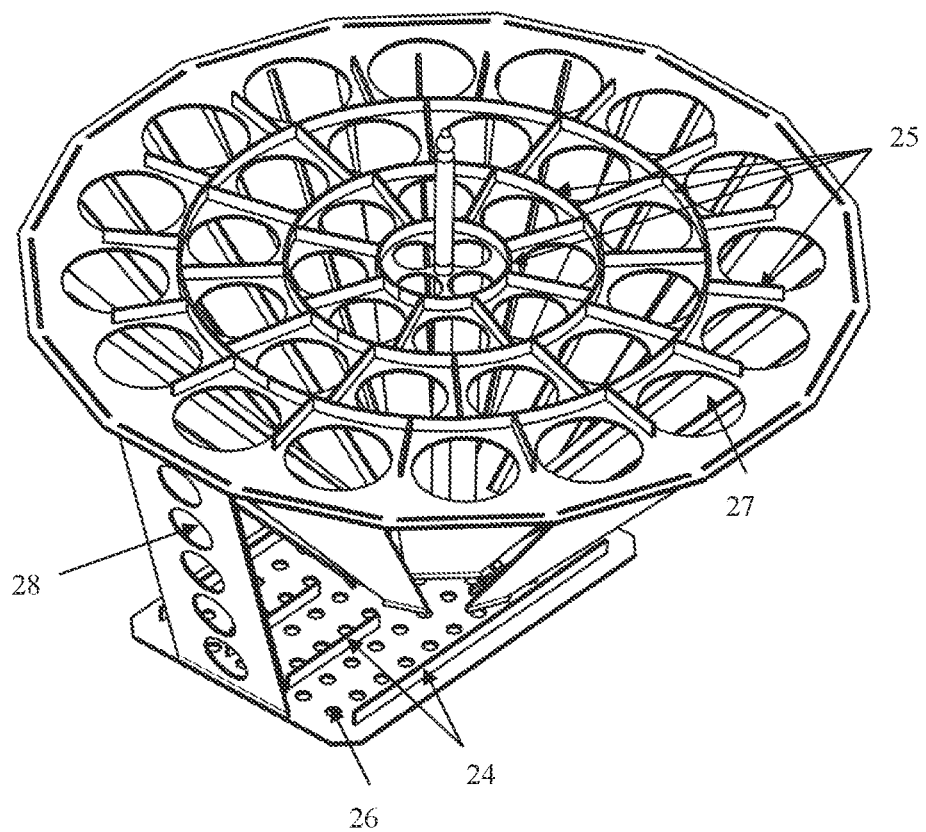
FIG. 5 shows a ¾ view of the inductor from below.
Figure 6:
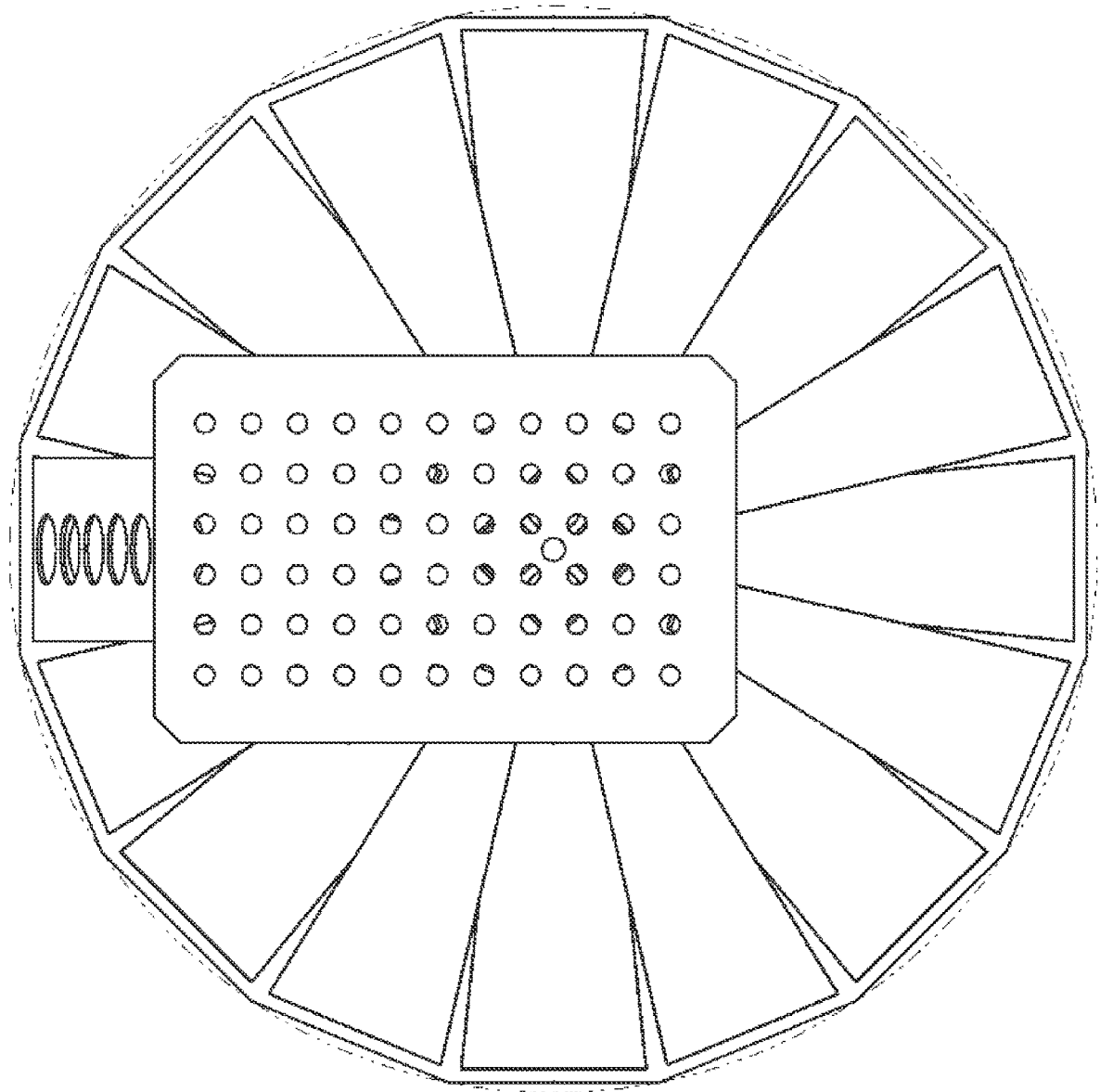
FIG. 6 shows a view of the inductor from above.

The invention may be implemented as shown in the figures, with the inductor (13) in form of two truncated regular pyramids with bottom bases located in one plane and top bases located in another plane. The pyramids are rotated relative to each other around their common axis. In all side facet planes of the truncated pyramids or in some of them, metal side facet plates (17) of the first truncated pyramid and metal side facet plates (18) of the second truncated pyramid are located. These plates are connected to the metal plate (15) of the top base and to the metal plate (16) of the bottom base, with those plates located in planes of the upper and bottom bases of the first and second truncated pyramids. Gaps (20) are provided between lateral edges of adjacent side facet plates (17) and (18). The electrode (19) of the inductor (13) connected to the metal plate (15) of the top base and to the metal plate (16) of the bottom base is placed along the common axis of the truncated pyramids. The electrode (19) protrudes beyond the metal plate (15) of the top base towards the reactor electrode (6) and beyond the metal plate (16) of the bottom base. Surfaces of the metal side facet plates (17) and (18) facing the inductor electrode (19) have ribs (21). Surface of the metal side plate (22) facing the inductor electrode (19) has ribs (23) and holes (28). The top base plate (15) has top base ribs (24) and holes (26). The bottom base plate (16) has bottom base ribs (25) and holes (27).

The inductor (13) operates as follows. Upon application of a high voltage pulse from the source of high voltage pulses (8), a burst of the gap between the reactor electrode (6) and the inductor electrode (19) occurs. After that, highly divergent fields are formed near side ribs of the plates (15, 16, 17, 18, 22), near ribs (21, 23, 24, 25) installed on surfaces of these plates, near edges of holes (26, 27, 28) and near a lower end of the inductor electrode (19) having highly curved surfaces, thus causing corona discharge streamers that propagate inside and outside the inductor in the reactor cavity, which broaden area of active plasma reactions. As is known from [1], large number of streamers occur near the ribs and hole edges with each pulse. The streamers start multiplying and spreading towards the conductive bottom (10) of the body (1), thus forming pulsed corona discharge. Further, a portion of compressed residential solid waste is fed into the reactor from the dispensing device (11) for feeding waste to be treated via the input opening (2). Entry of atmospheric air into the body (1) is restricted during the waste feeding via the input opening (2).

Plasma of corona discharge exerts an effect on water contained in the supplied waste and causes formation of free radicals upon destruction of water molecules: $H_2O \rightarrow OH\cdot + H\cdot$. In addition, other active substances are formed in the reactor due to pulsed corona discharge streamers: $O_3$, $O_2(a^1\Delta)$, $H_2O_2$, OH (mentioned above), $O(^3P)$, NO, $HNO_2$ and $HNO_3$. Corona discharge also causes ultraviolet (UV) radiation. The above-mentioned active substances and UV radiation destroy any organic and inorganic substances contained in the waste to be treated, thus providing destruction thereof and formation of harmless gaseous reaction products, namely, water and carbon dioxide. Non-organic contents of the waste are destroyed by acids $HNO_2$ and $HNO_3$, which are formed in the reactor due to corona discharge. Process of oxidation of organic substances in water is a chain reaction [2]. Low-rate chain reaction may be initiated by atmospheric oxygen and ozone. High-rate chain reaction is initiated by OH· radicals. In other words, plasma-chemical destruction of both organic and inorganic substances contained in waste is provided in the device. Gaseous products of destruction enter the output opening (3) of the reactor.

Pyramidal configuration of the inductor facilitates removal of portions of waste loaded into the reactor, which enter the area of formation of active particles that are necessary for providing the plasma reactions. The portions of waste are removed aside, thus reducing probability of filling this area with waste, which also facilitates enhancement of the reactor operations. Moreover, holes in the metal plates and gaps between the side ribs facilitate both movement of active particle flows towards waste to be processed and movement of gaseous products of destruction towards the output opening of the reactor. In other words, the reactor equipped with the inductor described herein provides formation of a wide area of plasma-chemical reactions and prevents filling this area with waste.

Therefore, enhancement of the reactor operations is assured by means of (i) enlarging size of the streamer formation area and, correspondingly, the area of active plasma-chemical reactions owing to configuration of the inductor, and (ii) reducing possibility of filling this area with waste loaded into the reactor via the input opening.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

Non-Patent Publications (Incorporated Herein by Reference in their Entirety)

[1] Aristova N. A., Piskarev I. M., Ivanovskiy A. V., Selemir V. D., Spirov G. M., Shlepkin S. I., *Initiation of chemical*

*reactions by electrical discharge in dielectric-gas-liquid configuration*, Physical Chemistry Journal, 2004, Vol. 78, #7, pages 1326-1331.

[2] Piskarev I. M., *Oxidation-reduction processes in water initiated by electrical discharge above water surface*, General Chemistry Journal, 2001, Vol. 71, Issue 10, page 1622.

What is claimed is:

1. An inductor for a reactor of a waste treatment device, comprising:
    two truncated regular pyramids having bottom bases located in one plane and top bases located in another plane, the two truncated regular pyramids rotated relative to each other around a common axis of the two truncated regular pyramids,
    wherein metal side facet plates are located in all or some of side facet planes of the two truncated regular pyramids,
    the metal side facet plates connected to metal plates of the respective top and bottom bases located in planes of the top and bottom bases so that gaps exist between lateral edges of adjacent metal side facet plates; and
    an inductor electrode located along the common axis of the two truncated regular pyramids,
    wherein the inductor electrode is connected to the metal side facet plates of the top and bottom bases and protrudes beyond the top base towards a reactor electrode.

2. The inductor of claim 1, wherein the two truncated regular pyramids are rotated around the common axis by an angle so as each side rib of one of the two truncated regular pyramid is located at equal distances from two adjacent side ribs of the other of the two truncated regular pyramid.

3. The inductor of claim 1, wherein a lower end of the inductor electrode protrudes beyond the bottom base, and the lower end of the inductor electrode is sharpened.

4. The inductor of claim 1, wherein the two truncated regular pyramids have equal radii of inscribed circles of the bottom bases of the truncated pyramids and have different radii of inscribed circles of the top bases of the two truncated regular pyramids.

5. The inductor of claim 1, wherein places of connection of the metal side facet plates to the bottom base are interleaved.

6. The inductor of claim 1, wherein the metal side facet plates are trapezoids.

7. The inductor of claim 1, wherein upper ribs of the metal side facet plates are located along a circle that is coaxial with the inductor electrode.

8. The inductor of claim 1, wherein upper ribs of the metal side facet plates are next but one connected to the top base plate along two circles that are coaxial with the inductor electrode.

9. The inductor of claim 1, wherein the top base is a rectangle shifted towards an input opening of the reactor and away from the common axis of the two truncated regular pyramids, and
    wherein the top base plate has holes and ribs directed to the bottom base.

10. The inductor of claim 1, wherein the bottom base plate has holes and ribs directed away from the top base.

11. An inductor, comprising:
    two truncated pyramids having bottom bases located in one plane and top bases located in another plane, the two truncated pyramids rotated relative to each other around a common axis,
    wherein metal side facet plates are located in side facet planes of the two truncated pyramids,
    the metal side facet plates connected to metal plates of the respective top and bottom bases located in planes of the top and bottom bases so that gaps exist between lateral edges of adjacent metal side facet plates; and
    an inductor electrode located along the common axis,
    wherein the inductor electrode is connected to the metal side facet plates of the top and bottom bases and protrudes beyond the top base.

* * * * *